United States Patent [19]
Kobayashi

[11] Patent Number: 5,258,239
[45] Date of Patent: Nov. 2, 1993

[54] METAL-AIR CELL HAVING A PIEZOELECTRIC AIR-SUPPLY PUMP

[75] Inventor: Kazuo Kobayashi, Kakamigahara, Japan

[73] Assignee: Brother Kogyo Kabushiki Kaisha, Nagoya, Japan

[21] Appl. No.: 21,106

[22] Filed: Feb. 23, 1993

[30] Foreign Application Priority Data

Apr. 22, 1992 [JP] Japan .................................. 4-103148

[51] Int. Cl.⁵ .......................................... H01M 12/06
[52] U.S. Cl. ....................................... 429/27; 429/61; 429/90
[58] Field of Search ..................... 429/27, 12, 17, 19, 429/13, 61, 90; 320/2, 29, 30

[56] References Cited

U.S. PATENT DOCUMENTS

| | | | |
|---|---|---|---|
| 4,913,983 | 4/1990 | Cheiky | 429/27 |
| 5,168,016 | 12/1992 | Hashimoto | 429/27 |
| 5,208,526 | 5/1993 | Goldman et al. | 429/27 X |

*Primary Examiner*—Anthony Skapars
*Attorney, Agent, or Firm*—Oliff & Berridge

[57] ABSTRACT

The present invention relates to a metal-air cell having a piezo-electric pump. The piezo-electric pump has a characteristic of moderate change of air flow speed relative to the pressure. Accordingly, the air supply speed can be controlled easily. This characteristic enables small and simple construction of the metal-air cell with the maximum electrical energy being obtained from the cell.

23 Claims, 7 Drawing Sheets

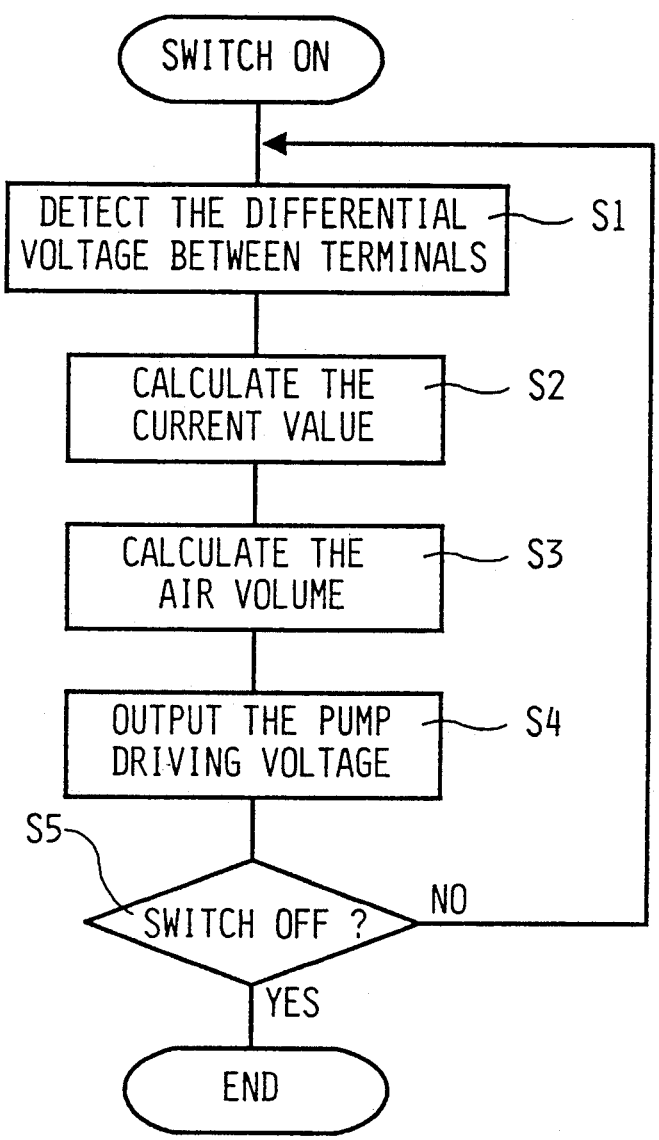

Fig.6

| VOLTAGE BETWEEN TERMINALS [ΔV] | OUTPUT VOLTAGE [V] |
|---|---|
| 1.20 | 5.3 |
| 1.15 | 13.0 |
| 1.10 | 17.6 |
| 1.05 | 21.2 |
| 1.00 | 24.3 |
| 0.95 | 27.0 |
| 0.90 | 29.5 |

~26

5,258,239

METAL-AIR CELL HAVING A PIEZOELECTRIC AIR-SUPPLY PUMP

BACKGROUND OF INVENTION

1. Field of the Invention

The present invention relates to a metal-air cell, and more particularly to a metal-air cell utilizing a piezo-electric pump.

2. Description of Related Art

Secondary cells, such as a nickel-cadmium cell, a nickel-hydrogen cell or a lead storage battery are well-known. These secondary batteries are often used in small-sized electronic devices. However, with the popularization of small-sized electronic devices and the changing environment and uses surrounding such devices, there is an increasing demand for a secondary cell having a higher energy density. The lithium secondary cell has drawn attention for it's high energy density. However, due to safety problems stemming from it's high flammability, the lithium secondary cell has not become popular.

The recently-developed metal-air cell is expected to replace the nickel-cadmium cell as the next-generation secondary cell. For example, the zinc-air cell represents such a metal-air cell which is a suitable substrate for the lithium secondary cell. In the zinc-air cell, supplying a required amount of atmospheric molecular oxygen, by supplying a corresponding amount of air, to the positive electrode enables a charge/discharge reaction at the positive electrode:

$$\tfrac{1}{2}O_2 + H_2O + 2e \rightleftharpoons 2OH .$$

Meanwhile, a charge/discharge reaction occurs at the negative electrode:

$$Zn + 2OH \rightleftharpoons ZnO + H_2O + 2e .$$

Hence, the zinc-air cell has an overall reaction:

$$Zn + \tfrac{1}{2}O_2 \rightleftharpoons ZnO$$

As described above, since the zinc-air cell consumes a required amount of atmospheric molecular oxygen at the positive electrode, the conventional zinc-air cell has, in general, an electric fan equipped in the casing.

With this construction, it is difficult to attain a high net energy density because of the difficulty in reducing the volume which is consumed by the electric fan. The electric fan of the prior art zinc-air cell is similar to those used in conventional personal computers. The electric fan is approximately 50 mm by 150 mm by 200 mm and one electric fan can be connected to up to, and usually is connected to, six of the zinc-air cells. In addition, as shown in FIG. 5, the air inflow speed for the fan is highly dependent on the pressure differential between the intake and outlet valves (i.e., a small change in the pressure differential results in a large change in the air flow rate), making it difficult to control the air intake speed. Accordingly, not only is the air flow rate of the electric fan difficult to control, but all of the zinc-air cells connected to the electric fan are turned on and off and controlled as a group, even though the operator may desire to turn on or off or control only one of the zinc-air cells. Consequently, the inaccurate control of the air supply to the positive electrode of the zinc-air cell degrades the performance of the zinc-air cell. The present invention solves the above problem.

SUMMARY OF THE INVENTION

It is therefore an object of the present invention to provide a small-sized and simply-structured metal-air cell with enhanced performance by precisely controlling the amount of air supplied to the positive electrode.

To achieve the above object, the metal-air cell of the present invention has an air supply means for supplying air to the electrode. Particularly, the air supply means of the present invention comprises a piezo-electric pump.

In the metal-air cell having the above construction, the piezo-electric pump operates as an air supply means for supplying air to the electrode. The piezo-electric pump facilitates the air supply control and enhances the electrical characteristics of the metal-air cell.

BRIEF DESCRIPTION OF THE DRAWINGS

The preferred embodiment of the present invention will be described in detail with reference to the following figures wherein:

FIG. 4 is a flowchart showing the operation of the zinc-air cell of the present embodiment;

FIG. 6 is a chart conceptually depicting the ROM which holds output voltage value corresponding to the voltage applied between the terminals.

DETAILED DESCRIPTION OF THE PREFERRED EMBODIMENTS

Hereinafter, a preferred embodiment of the preferred invention is shown with reference to figures.

Figure 1:
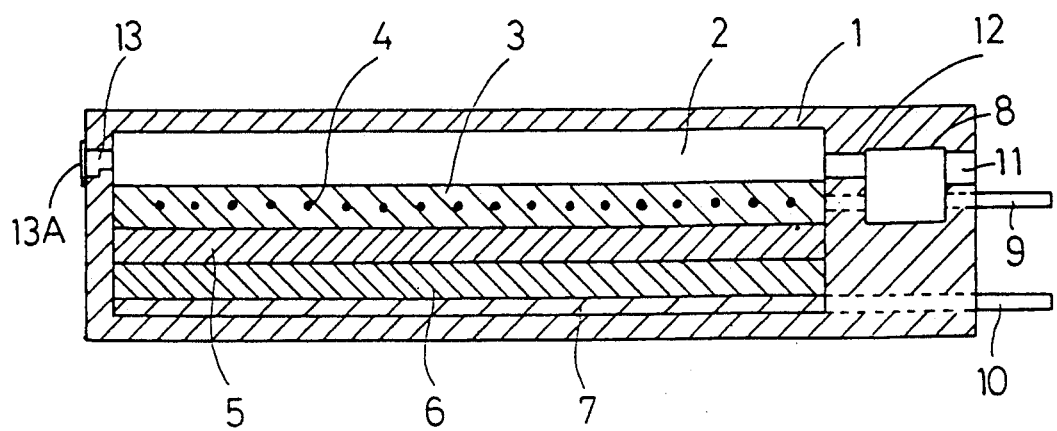
FIG. 1 is a cross-sectional view of the zinc-air cell of the preferred embodiment.

The construction of the zinc-air cell of the preferred embodiment is shown in FIG. 1. The zinc-air cell of the preferred embodiment has a cell casing 1, an air diffusion chamber 2, a positive electrode 3, a separator 5, a negative electrode 6, a piezo-electric pump 8, a positive electrode terminal 9 and a negative electrode terminal 10.

The cell casing 1 is formed by polypropylene or the like in an injection molding process. The material used must in particular be resistant to alkali (basic) substances. An air intake port 11 and an air outlet port 13 are provided on the right-hand and left-hand faces, respectively, of the cell casing 1 to connect the interior of cell casing 1 to the surrounding environment. The air intake port 11 is connected to the piezo-electric pump 8 to supply air to the piezo-electric pump 8. The air outlet 13 is connected to the air diffusion chamber 2 to exhaust air from the air diffusion chamber 2 to the outside of the cell casing 1. A one-way valve 13A is provided at the air outlet port 13. The one-way valve 13A allows air in the air diffusion chamber 2 to flow out of the cell casing 1, while prohibiting air to flow in the opposite direction. The cell casing 1 houses the piezo-electric pump 8 and forms a hollow chamber occupying most of the volume of the cell casing. The negative electrode 6, the separator 5 and the positive electrode 3 are located within the hollow chamber in that sequence. The air diffusion chamber 2 in this embodiment is realized by a vacant portion of the hollow chamber for reducing air resistance. The air diffusion chamber 2 is connected to the piezo-electric pump 8 via the air inflow duct 12.

The positive electrode 3 is formed by pressure connecting carbon with catalysis active platinum to a positive collector 4, which consists of a nickel mesh. The positive terminal 9 is connected to the positive collector 4 and the positive terminal 9 projects outwardly from the cell casing 1.

Preferably, rayon permeated by potassium hydroxide (KOH) at a concentration of 5 mol/liter forms the separator 5 for separating the positive electrode 3 and the negative electrode 6.

The negative electrode 6 is formed by solidifying fine-grained zinc on a negative collector 7. The negative collector 7 preferably comprises nickel. The negative terminal 10 is connected to the negative collector 7. The negative terminal 10 projects outwardly from the cell casing 1.

Figure 2:
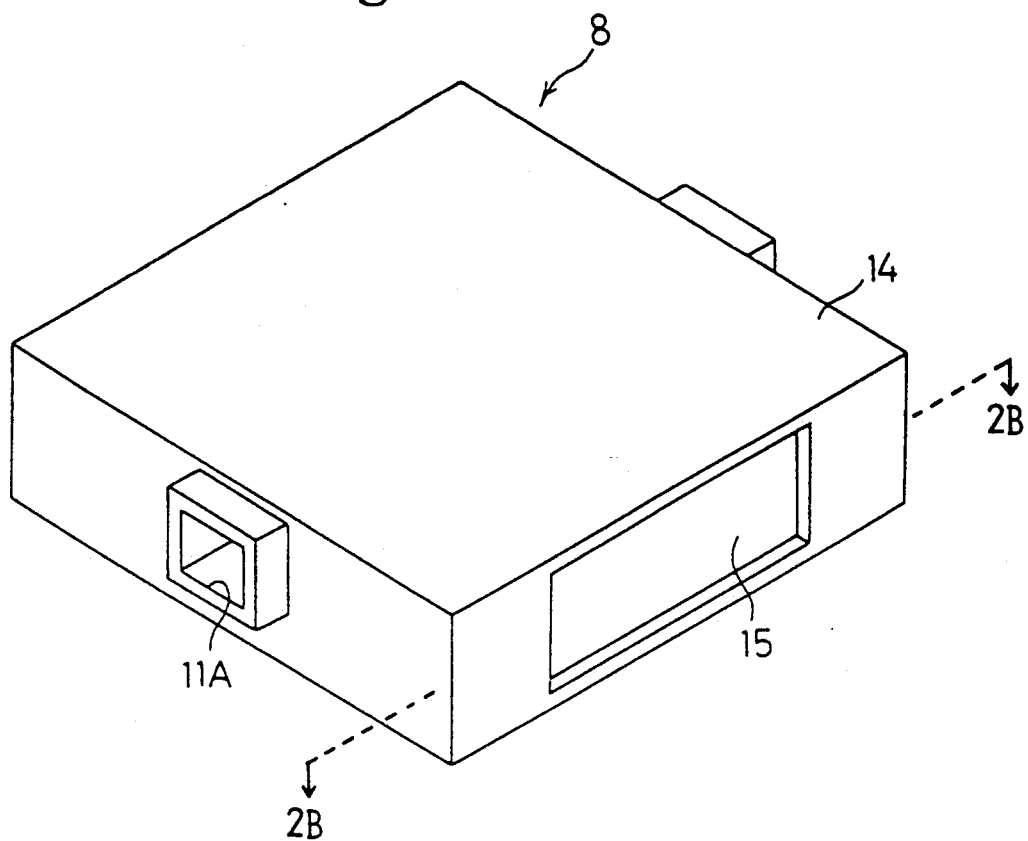
FIG. 2A is a perspective view of the piezo-electric pump in the zinc-air cell of the present embodiment.
FIG. 2B is a cross-sectional view of the piezo-electric pump in the zinc-air cell of the present embodiment.
Figure 2:
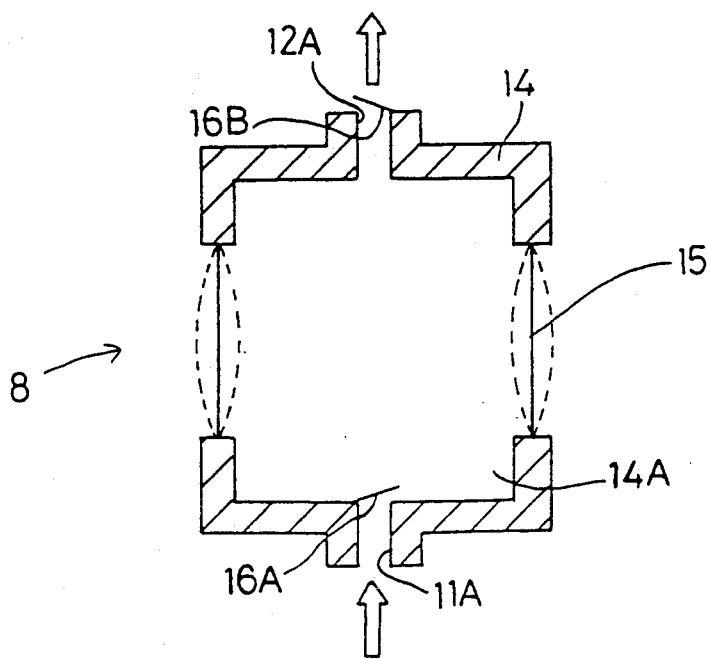

The construction of the piezo-electric pump 8 is described in detail with reference to FIGS. 2A and 2B. The piezo-electric pump 8 comprises a pump casing 14 and piezo-electric ceramic panels 15.

The pump casing 14 consists of elastic material such as rubber, and is shaped in a rectangular block. Inside the pump casing 14 is a vacant chamber 14A. On opposite sides of the pump casing 14 are an air inflow port 11A and an air outflow port 12A, which are connected to the air intake port 11 and the air inflow duct 12, respectively. The air inflow port 11A has a one-way inflow valve 16A, allowing air to flow unilaterally from the air intake port 11 to the vacant chamber 14A in the piezo-electric pump 8. The air outflow port 12A has a one way outflow valve 16B to flow unilaterally out of the vacant chamber 14A into the air inflow duct 12.

The sides of the pump casing 14 comprise a pair of piezo-electric ceramic panels 15. Since the construction of the piezo-electric ceramic panels 15 is well known, a detailed description is omitted. The piezo-electric ceramic panels 15 vibrate when an alternating voltage is applied to them. The amplitude of the vibration is controlled by varying the amplitude of the alternating voltage, consequently varying the volume of the vacant chamber 14A. As is apparent from the above description, air pressure in the vacant chamber 14A is easily controlled by varying the amplitude of the voltage applied to the piezo-electric ceramic panels 15. As a result, the volume of air supplied to the air diffusion layer 2 is easily controlled.

Figure 3A:
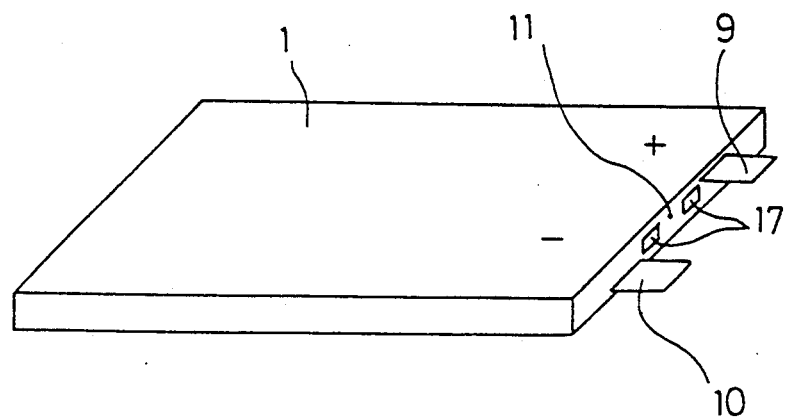
FIG. 3A is a perspective view of the zinc-air cell of the present embodiment.
Figure 3B:
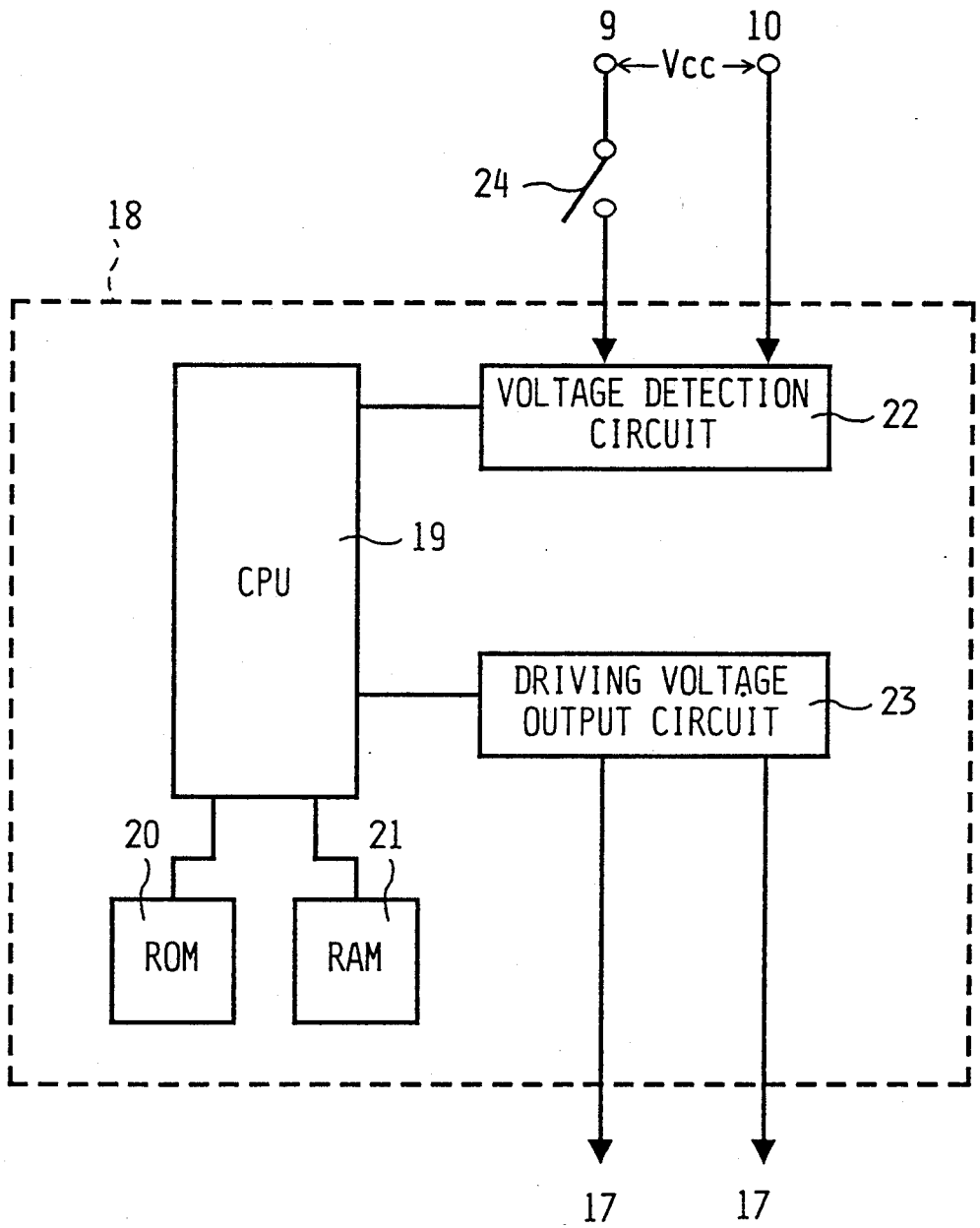
FIG. 3B is a block diagram of the air flow control device in the present embodiment.

The piezo-electric ceramic panels 15 are connected to the piezo-electric pump controller terminals 17 provided on the cell casing 1 as shown in FIG. 3A. When the zinc-air cell is in operation, the alternating voltage is controlled by a control circuit 18 (shown in FIG. 3B) connected to the piezo-electric pump control terminals 17.

The control circuit 18 acts as a control device for the piezoelectric pump 8, and comprises a CPU 19, a ROM 20, a RAM 21, a voltage detection circuit 22 and a driving voltage output circuit 23. The ROM 20, the RAM 21, the driving voltage output circuit 23 and the voltage detection circuit 22 are connected to the CPU 19.

The voltage detection circuit 22 is connected to the positive terminal 9 and the negative terminal 10. The voltage detection circuit 22 measures the voltage $V_{cc}$ between the positive and negative terminals 9 and 10 and constantly sends the results of the measurements to the CPU 19. The switch 24 provided between positive terminal 9 and the voltage detection circuit 22 makes and breaks (i.e., turns on and off) the zinc-air cell.

The CPU 19 continuously monitors the voltage between the terminals $V_{cc}$ according to the information transmitted from the voltage detection circuit 22 and stores the resulting voltage value in the RAM 21. The CPU 19 determines the volume of the air to be sent from the piezo-electric pump 8 to the air diffusion chamber 2 based on the deviation of the voltage between the terminals, $V_{cc}$, stored in the RAM 21 from the reference voltage $V_{Ref}$ stored in the ROM 20. The optimal voltage to be applied to the piezo-electric ceramic panels 15 is also determined by the CPU 19. The CPU 19 transmits a control signal indicative of the determined optimal voltage to the driving voltage output circuit 23.

The driving voltage output circuit 23 boosts and converts the direct voltage control signal to an alternating voltage drive signal and outputs the piezo-electric pump driving voltage to the piezo-electric ceramic panels 15 via the piezo-electric pump control terminals 17. Accordingly, the control circuit 18 continuously monitors the voltage $V_{cc}$ between the positive terminal 9 and the negative terminal 10 and controls the amplitude of the output voltage signal to be supplied to the piezo-electric pump 8. Therefore, the volume of the air supplied to the air diffusion layer 2 can be controlled easily based on the voltage $V_{cc}$ between the terminals 9 and 10.

The operation of the piezo-electric pump 8 is described with reference to FIG. 4.

After an operator turns on the switch 24, the positive terminal 9 is connected to the voltage detection circuit 22 and the air thereby introduced into the air diffusion chamber 2 causes the above-outlined charge/discharge reaction at the positive electrode 3. The circuit connection also causes the charge/discharge reaction at the negative electrode 6. The reaction generates a voltage differential between the terminals of about 1.1 V, initiating operation of the CPU 19. In step 31, the CPU 19 instructs the voltage detection circuit 22 to measure the voltage differential $V_{cc}$ between the positive terminal 9 and the negative terminal 10. The voltage detection circuit 22 sends the result of the measurement to the CPU 19. Then, in step S2, the CPU 19 receives the differential voltage value $V_{cc}$ and determines a current value I (in amps) from the equation:

$$I = 5.3 * \sqrt{V_{Ref} - V_{cc}}$$

wherein:

$V_{Ref}$ represents the reference voltage and has a fixed value of 1.21 volts in the preferred embodiment.

Next in step S3, the CPU 19 determines the volume of the air necessary to provide the required amount of atmospheric molecular oxygen ($O_2$) at the positive electrode 3 from the equation:

$$B = 17 * I$$

Theoretically, the reaction consumes 17 ml/min of air to maintain a 1 Amp-second (AS) current, hence the required volume of air B, in milliliters per minute.

In the preferred embodiment, the efficiency in the air consumption is approximately 33%. That is, one-third of the atmospheric molecular oxygen present in a milliliter of air is consumed in the reaction. Accordingly, the CPU 19 determines the inflow air volume C [ml/min] by the following equation:

$$C = 3 \cdot B$$

The CPU 19 further determines the voltage Y to be applied to the piezo-electric ceramic panels 15 from the inflow air volume C according to the following equation:

$$Y = 0.2 \cdot C$$

Then, in step S4, the CPU 19 sends the voltage value Y determined from the above equation to the driving voltage output circuit 23. The driving voltage output circuit 23 boosts the voltage signal Y to an alternating voltage having a frequency of about 100Hz and applies the voltage signal to the piezo-electric ceramic panels 15 via the piezo-electric pump control terminals 17.

Then, in step S5, the CPU 19 examines the switch 24 (S5). If the switch 24 is found to be ON in the examination (S5:No), the CPU 19 returns to step S1. Otherwise, if the CPU 19 finds that the switch is OFF (S5:Yes), the CPU 19 stops operation.

In a zinc-air cell having the above construction, applying a voltage to the piezo-electric ceramic panels 15 makes the piezo-electric ceramic panels 15 vibrate, thereby changing the volume of the vacant chamber 14A.

As a result, when the ceramic panels vibrate inwardly, the air in the vacant chamber 14A flows out through the one-way outflow valve 16B through the air inflow duct 12 into the air diffusion chamber 2. Then, when the ceramic panels 15 vibrate outwardly, an air flow is drawn through the one-way inflow valve 16A into the vacant chamber 14A. The chemical reaction given by three chemical formulas listed above consumes the atmospheric molecular oxygen present in the air present in the air diffusion chamber 2 and generates electric energy. The electric energy generated in the reaction is supplied to the external devices (not shown in the figures) via the positive electrode 9 connected to the positive collector 4 and the negative electrode 10 connected to the negative collector 7.

Figure 5:
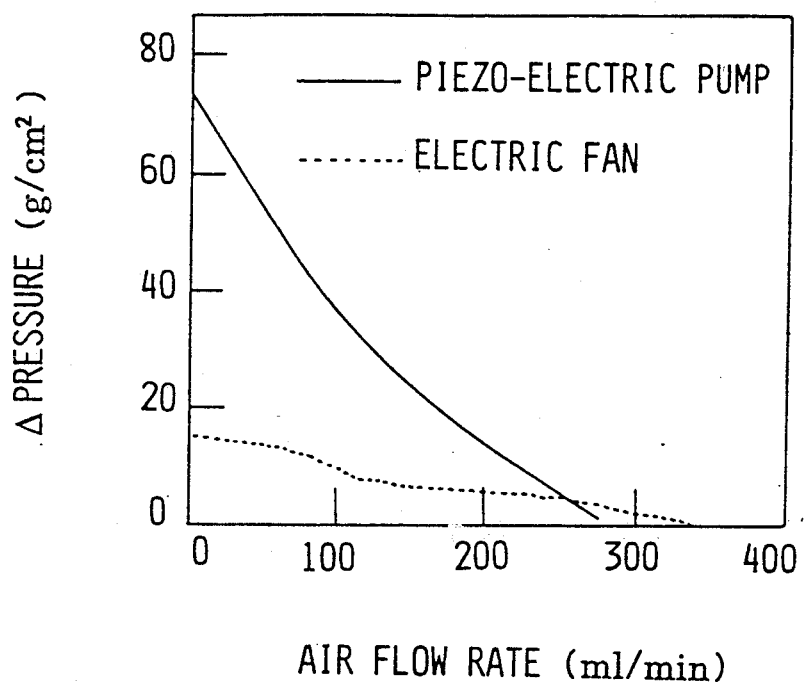
FIG. 5 is a chart showing the dependence of the air flow speed on the pressure differential.

As shown in FIG. 5, the piezo-electric pump 8 facilitates optimal air flow speed control because the air flow speed is less dependent on changes in air pressure. Reiterating the air speed control operation keeps the required amount of air flowing into the air diffusion chamber 2, generating the required amount of electric energy.

In the preferred embodiment, a zinc-air cell having the above construction occupies a volume of 90 mm by 55 mm by 7 mm = 34,650 $mm^3$. The piezo-electric pump occupied a volume of 10 mm by 10 mm by 3 mm = 300 $mm^3$, making up less than 1% of the total cell volume.

An experiment was performed under fixed current control at a 1 amp current to measure the electrical capacity of the zinc-air cell. The theoretical calculation gives a required air supply amount of 17 ml/min to supply the necessary atmospheric molecular oxygen. However, taking the efficiency of the reaction into consideration, the air supply amount was set at 50 ml/min. The zinc-air cell has a open loop differential voltage of 1.4 V. The zinc-air cell has a capacity of 10 Amp-hours (Ah) when the differential voltage between the terminals is 0.9 V, demonstrating that the zinc-air cell is highly practical in small-sized electronic devices.

As apparent from above description, the zinc-air cell of the present invention has achieved reduction in the volume with simplified, small structure by employing a piezo-electric pump. Furthermore, the piezo-electric pump has a moderate air flow speed characteristic dependent on the differential pressure, facilitating control of air the flow speed to the electrodes, thus allowing a maximum use of the performance of the metal-air cell.

The above-outlined preferred embodiment shall not be considered as limiting the scope of the present invention and modifications can be made within the scope of the present invention.

For example, the CPU 19 determines the required air amount at the positive electrode based on the difference between the reference voltage $V_{Ref}$ and $V_{cc}$. However, the CPU 19 may control the driving voltage output circuit 23 by directly sending the voltage value Y given by the following equation.

$$Y = 53 \cdot \sqrt{V_{Ref} - V_{cc}}$$

In the zinc-air cell so constructed, the CPU 19 directly determines the output voltage Y corresponding to the voltage differential between the terminals $V_{cc}$ from the ROM look-up table 26 (as shown in FIG. 6). The ROM look-up table 26 is stored in the ROM 20. Further modification can also be made to the ROM look-up table 26 by reducing the voltage step from 0.05 V to 0.01 V or 0.001 V.

In the above-outlined preferred embodiment, a pair of piezo-electric ceramic panels 15 are provided in the piezo-electric pump. However, only one panel or three or more panels may be provided.

What is claimed is:

1. A metal-air cell for supplying electric power, comprising:
   an electricity generating means for generating electric power upon the presence of air;
   an electricity supplying means for supplying the generated electric power externally of the metal-air cell;
   an air supply means for supplying air to the electricity generating means;
   a control means for controlling operations of the metal-air cell; and
   a cell casing for housing at least the electricity generating means, the electricity supplying means and the air supply means, wherein the air supply means comprises a piezo-electric air pump.

2. The metal-air cell of claim 1, wherein the piezo-electric pump comprises:
   a housing having an air inflow port and an air outflow port;
   a first one-way valve provided on the inflow port to allow air to enter the housing;
   a second one-way valve provided on the outflow port to allow air to exit from the housing; and at least one piezo-electric panel provided in the housing for controllably varying an interior volume of the housing.

3. The metal-air cell of claim 2, wherein the housing is formed from a flexible material.

4. The metal-air cell of claim 2, wherein exactly two piezo-electric panels are provided in the housing.

5. The metal-air cell of claim 2, wherein the at least one piezo-electric panel is formed of a ceramic material.

6. The metal-air cell of claim 2, wherein the electricity generating means comprises an air chamber, a positive electrode, a negative electrode, and a separator for separating the positive and negative electrodes.

7. The metal-air cell of claim 6, wherein the electricity supplying means comprises a positive collector attached to a positive terminal and the positive electrode; and a negative collector attached to a negative terminal and the negative electrode.

8. The metal-air cell of claim 2, wherein the control means comprises a CPU, a voltage detection circuit for detecting an output voltage of the metal air cell, a memory means, and a voltage driving circuit outputting a driving voltage for driving the at least one piezo-electric panel.

9. The metal-air cell of claim 8, wherein the memory means comprises at least one of a ROM portion and a RAM portion.

10. The metal air cell of claim 9, wherein the ROM portion comprises a look-up table for converting from the output voltage to the driving voltage.

11. A metal-air cell, comprising:
electricity generating means for generating electric power upon the presence of fresh air;
air supply means for controllably supplying fresh air to the electricity generating means; and
a cell casing for housing the electricity generating means and the air supply means;
wherein the air supply means comprises a piezo-electric pump.

12. The metal-air cell of claim 11, wherein the piezo-electric pump comprises:
a pump casing forming a hollow pump chamber;
at least one piezo-electric element, each at least one element forming a part of a wall of the pump casing;
air inflow means provided in the pump casing for allowing fresh air to flow unilaterally into the hollow pump chamber; and
air outflow means provided in the pump casing for allowing fresh air to flow unilaterally out of the hollow pump chamber.

13. The metal air cell of claim 12, wherein the air inflow means comprises an air inflow port and a one way air inflow valve provided in the air inflow port, and wherein the air outflow means comprises an air outflow port and a one-way air outflow valve provided in the air outflow port.

14. The metal-air cell of claim 12, wherein each of at least one piezo-electric element comprises a piezo-electric ceramic panel.

15. The metal-air cell of claim 12, further comprising control means for controlling the piezo-electric pump.

16. The metal-air cell of claim 15, wherein each at least one piezo-electric element is connected to the control means through a piezo-electric control terminal.

17. The metal-air cell of claim 15, further comprising an electricity supply means for supplying electricity from the electricity generating means to at least one of an external load and the control means.

18. The metal air cell of claim 17, wherein the electricity generating means comprises a positive electrode and a negative electrode, and wherein the electricity supply means comprises a positive terminal connected to the positive electrode and extending outwardly of the cell casing, and a negative terminal connected to the negative electrode and extending outwardly from the cell casing.

19. The metal-air cell of claim 18, wherein the control means is connectable to the positive and negative terminals, the control means controlling an operation of the piezo-electric pump based on a voltage difference between the positive and negative terminals.

20. The metal-air cell of claim 19, wherein the control means comprises:
a voltage detecting circuit for detecting the voltage difference;
a control circuit for determining an operating voltage for the piezo-electric pump based on the detected voltage difference; and
a piezo-electric driving circuit for outputting driving signal to the piezo-electric pump based on the determined operating voltage.

21. The metal-air cell of claim 20, wherein the control circuit determines a volume flow rate of fresh air for the electricity generating means based on the detected voltage difference and determines the operating voltage based on the determined volume flow rate.

22. The metal air cell of claim 19, wherein the control means detects the voltage difference, directly determines a driving voltage for the piezo-electric pump from the detected voltage difference and outputs the driving voltage to the piezoelectric pump.

23. The metal-air cell of claim 22, wherein the control means comprises memory means for storing a plurality of predetermined driving voltages and corresponding voltage differences, and a voltage difference detecting means for detecting the voltage difference, wherein when the control means inputs the detected voltage difference to the memory means, the memory means outputs one of the plurality of predetermined driving voltages.

* * * * *